US010395502B2

(12) United States Patent
Eulloqui et al.

(10) Patent No.: US 10,395,502 B2
(45) Date of Patent: *Aug. 27, 2019

(54) SMART MOBILITY ASSISTANCE DEVICE

(71) Applicant: AT&T Intellectual Property I, L.P., Atlanta, GA (US)

(72) Inventors: Enrique Eulloqui, San Antonio, TX (US); Mary Ellen Nester, San Antonio, TX (US); Mimi Gourley, San Antonio, TX (US); Jessica Garza, San Antonio, TX (US); John Staggs, San Antonio, TX (US); Larry Pearson, San Antonio, TX (US); Renee Irby, San Antonio, TX (US); Morgan Waldon, Universal City, TX (US); Yvonne Galindo, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,213

(22) Filed: Oct. 8, 2018

(65) Prior Publication Data

US 2019/0043331 A1 Feb. 7, 2019

Related U.S. Application Data

(63) Continuation of application No. 15/622,096, filed on Jun. 14, 2017, now Pat. No. 10,096,228.

(51) Int. Cl.
*G08B 21/04* (2006.01)
*G06F 3/01* (2006.01)
(Continued)

(52) U.S. Cl.
CPC .......... *G08B 21/0492* (2013.01); *G01S 13/04* (2013.01); *G06F 3/016* (2013.01);
(Continued)

(58) Field of Classification Search
CPC ............................ G08B 21/0492; G01S 13/04
(Continued)

(56) References Cited

U.S. PATENT DOCUMENTS

| 5,280,622 A | * | 1/1994 | Tino | ........................ B25J 19/06 |
| | | | | 700/255 |
| 5,959,552 A | * | 9/1999 | Cho | ........................ B60R 19/38 |
| | | | | 180/167 |

(Continued)

OTHER PUBLICATIONS

Ando, Bruno, et al. "A sensing architecture for mutual user-environment awareness case of study: a mobility aid for the visually impaired." *IEEE Sensors Journal* 11.3 (2011): 634-640.

(Continued)

*Primary Examiner* — Allen T Cao

(57) ABSTRACT

In one example, the present disclosure describes a device, computer-readable medium, and method for providing smart mobility assistance. For instance, in one example, a device includes a set of sensors, a processor, a first set of feedback mechanisms, and a communication device. The set of sensors is to monitor an area surrounding a user of a mobility assistance device. The processor is to detect a hazard in the surrounding area, based on the monitoring. The first set of feedback mechanisms is to provide the user with an alert that notifies the user of the hazard. The communication device is to send a notification to a third party informing the third party of the hazard.

20 Claims, 4 Drawing Sheets

(51) Int. Cl.
 *G01S 13/04* (2006.01)
 *G06K 9/00* (2006.01)
 *G08B 21/02* (2006.01)
 *G01S 13/93* (2006.01)
(52) U.S. Cl.
 CPC ..... *G06K 9/00892* (2013.01); *G08B 21/0277* (2013.01); *G08B 21/043* (2013.01); *G08B 21/0469* (2013.01); *G01S 13/931* (2013.01); *G08B 21/0446* (2013.01); *G08B 21/0453* (2013.01); *G08B 21/0461* (2013.01); *G08B 21/0476* (2013.01)
(58) Field of Classification Search
 USPC .................................................. 340/6.1–6.15
 See application file for complete search history.

(56) References Cited

U.S. PATENT DOCUMENTS

| | | | |
|---|---|---|---|
| 6,356,210 B1 | 3/2002 | Ellis | |
| 6,808,291 B1* | 10/2004 | Aylward | B60Q 7/00 362/186 |
| 7,706,212 B1 | 4/2010 | Campbell | |
| 8,825,389 B1 | 9/2014 | Campbell et al. | |
| 8,884,809 B2* | 11/2014 | Hyde | G01S 13/86 340/573.1 |
| 8,924,218 B2 | 12/2014 | Corpier et al. | |
| 9,430,925 B2 | 8/2016 | Mittleman | |
| 9,492,343 B1 | 11/2016 | Ellis | |
| 9,576,479 B2 | 2/2017 | Kvetny et al. | |
| 9,626,841 B2 | 4/2017 | Fadell | |
| 9,640,055 B2 | 5/2017 | Fadell | |
| 9,640,061 B1 | 5/2017 | Klimanis | |
| 9,668,085 B2 | 5/2017 | Pi-Sunyer | |
| 9,672,728 B2 | 6/2017 | Deluliis | |
| 9,675,515 B2 | 6/2017 | Chou et al. | |
| 9,691,266 B2 | 6/2017 | Deluliis | |
| 9,697,713 B2 | 7/2017 | Fadell | |
| 9,711,036 B2 | 7/2017 | Fadell | |
| 9,787,424 B2 | 10/2017 | Filson | |
| 9,875,631 B2 | 1/2018 | Mittleman | |
| 2005/0235402 A1* | 10/2005 | Foote | A42B 3/003 2/425 |
| 2008/0135321 A1 | 6/2008 | Ripple et al. | |
| 2008/0228384 A1 | 9/2008 | Erickson et al. | |
| 2008/0251110 A1 | 10/2008 | Pede | |
| 2014/0085092 A1* | 3/2014 | Fadell | H04L 12/6418 340/628 |
| 2015/0070129 A1 | 3/2015 | Moore et al. | |
| 2015/0096876 A1* | 4/2015 | Mittleman | H01H 11/00 200/341 |
| 2015/0287310 A1* | 10/2015 | Deiiuliis | H04W 4/90 340/628 |
| 2015/0367176 A1 | 12/2015 | Bejestan et al. | |
| 2017/0003132 A1 | 1/2017 | Kim et al. | |
| 2017/0124276 A1 | 5/2017 | Tee | |

OTHER PUBLICATIONS

Kaur, Himanshu Singhalfi Amanpreet, and Raj esh Yadav. "Intelligent Aid for Visually Impaired and Old Age People." (2013).

* cited by examiner

SMART MOBILITY ASSISTANCE DEVICE

This application is a continuation of U.S. patent application Ser. No. 15/622,096, filed Jun. 14, 2017, now U.S. Pat. No. 10,096,228, which is herein incorporated by reference in its entirety.

The present disclosure relates generally to computer vision, and relates more particularly to devices, non-transitory computer-readable media, and methods for providing mobility assistance to a human user.

BACKGROUND

As people age or experience injuries, they may find themselves increasingly in need of assistance in getting from one place to another. For instance, injuries to or degradation of the knees, hips, back, and other parts of the body may significantly impair a person's mobility. In such circumstances, the person may turn to an assistance device such as a wheelchair, a walker, a cane, a crutch, a scooter, a prosthetic, or the like to make it easier to get around.

SUMMARY

In one example, the present disclosure describes a device, computer-readable medium, and method for providing smart mobility assistance. For instance, in one example, a device includes a set of sensors, a processor, a first set of feedback mechanisms, and a communication device. The set of sensors is to monitor an area surrounding a user of a mobility assistance device. The processor is to detect a hazard in the surrounding area, based on the monitoring. The first set of feedback mechanisms is to provide the user with an alert that notifies the user of the hazard. The communication device is to send a notification to a third party informing the third party of the hazard.

In another example, a method includes monitoring an area surrounding a user of a mobility assistance device, detecting a hazard in the surrounding area, based on the monitoring, providing the user with an alert that notifies the user of the hazard, in response to the detecting, and sending a notification to a third party informing the third party of the hazard, in response to the detecting.

In another example, a non-transitory computer-readable storage medium stores instructions which, when executed by a processor, cause the processor to perform operations. The operations include monitoring an area surrounding a user of a mobility assistance device, detecting a hazard in the surrounding area, based on the monitoring, providing the user with an alert that notifies the user of the hazard, in response to the detecting, and sending a notification to a third party informing the third party of the hazard, in response to the detecting.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides mobility assistance to a user. As discussed above, a person whose mobility has been impaired may turn to an assistance device such as a wheelchair, a walker, a cane, a crutch, a scooter, a prosthetic, or the like to make it easier to get around. However, while such devices can provide improved balance and support, they are not necessarily ideal for individuals who also experience visual impairments (as may be the case, for example, with elderly individuals). For instance, if a user has impaired vision, he may not be able to determine when there is an obstacle in the path of his walker.

Examples of the present disclosure provide a smart mobility assistance device that can provide vision support to a conventional mobility assistance device such as a wheelchair, a walker, a cane, a crutch, a scooter, a prosthetic, or the like. The vision support provided by the smart mobility assistance device allows for the detection of hazards in the user's surrounding area. Hazards may include external hazards such as obstacles, uneven or unstable terrain, or unfavorable weather conditions, and may also include health conditions or injuries such as falls, heart rates that are erratic or outside of a predefined range, insulin spikes, or the like.

Examples of the smart mobility assistance device include at least one sensor, a processor for processing the information captured by the sensor(s), and a feedback mechanism for providing alerts to the user responsive to the processing. Further examples of the smart mobility assistance device may include a communication device for receiving information from one or more remote sensors and/or for sharing information with a remote processing device (e.g., so that the information can be shared with a caregiver, a first responder, a relative, medical personnel, or the like). Examples of the device are lightweight and portable, so that the smart mobility assistance device can be attached in a non-permanent manner to a conventional mobility device (e.g., a walker, a wheelchair, or the like) or even integrated into a wearable item such as a hip pack. The smart mobility assistance device may also monitor the user's identity and/or location in order to facilitate assistance from third parties.

Figure 1:
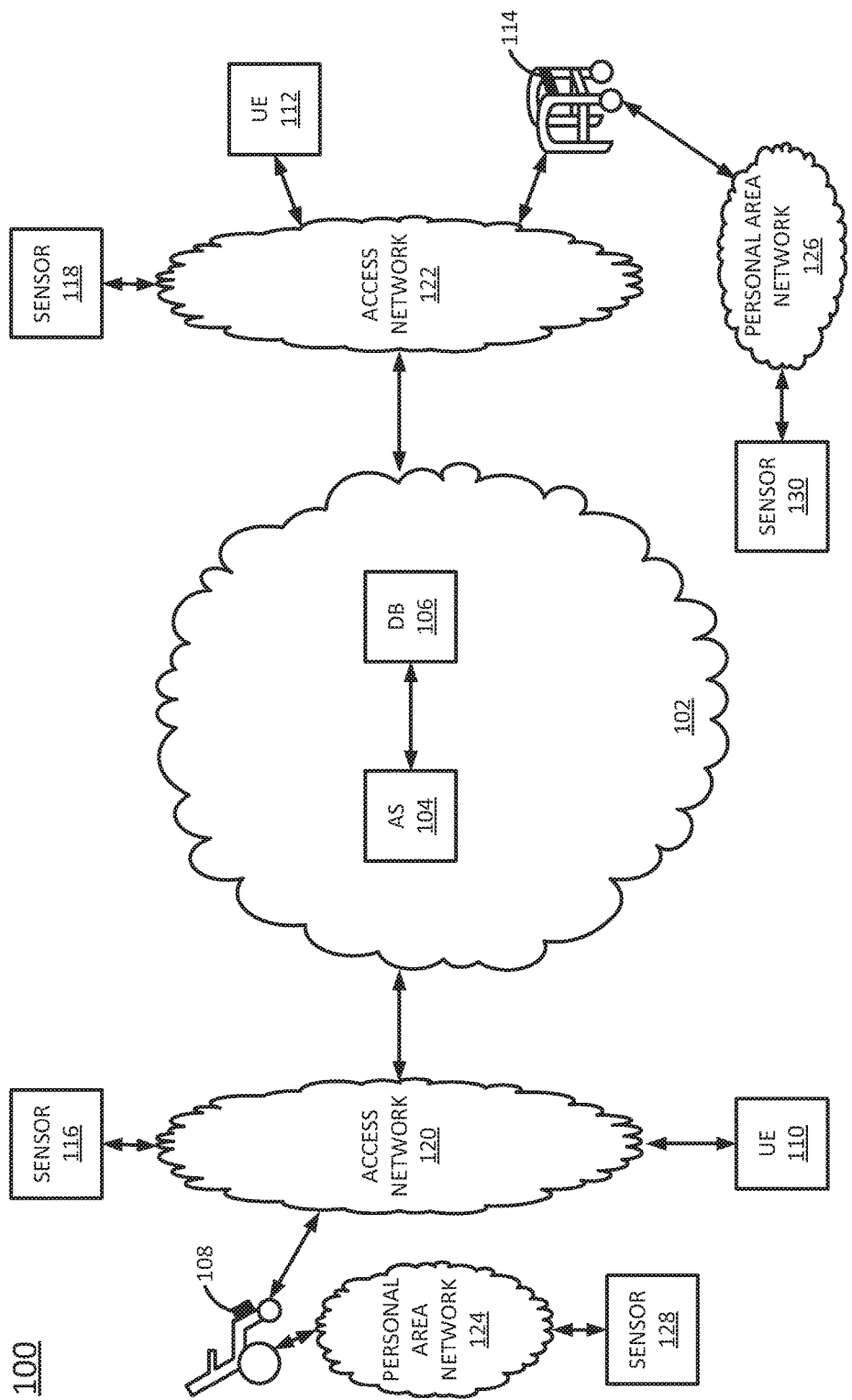
FIG. 1 illustrates an example network related to the present disclosure.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one example, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one example, the core network 102 may include an application server (AS) 104 and a database (DB) 106. Although only a single AS 104 and a single DB 106 are illustrated, it should be noted that any number of application servers and databases may be deployed. Furthermore, for ease of illustration, various additional elements of core network 102 are omitted from FIG. 1, including switches, routers, firewalls, web servers, and the like.

The core network 102 may be in communication with one or more access networks 120 and 122, which may be wired or wireless. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one example, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114. The access network 120 may be further in communication with one or more sensors 116 128, while the access network 122 may be further in communication with one or more sensors 118 and 130.

Figure 4:
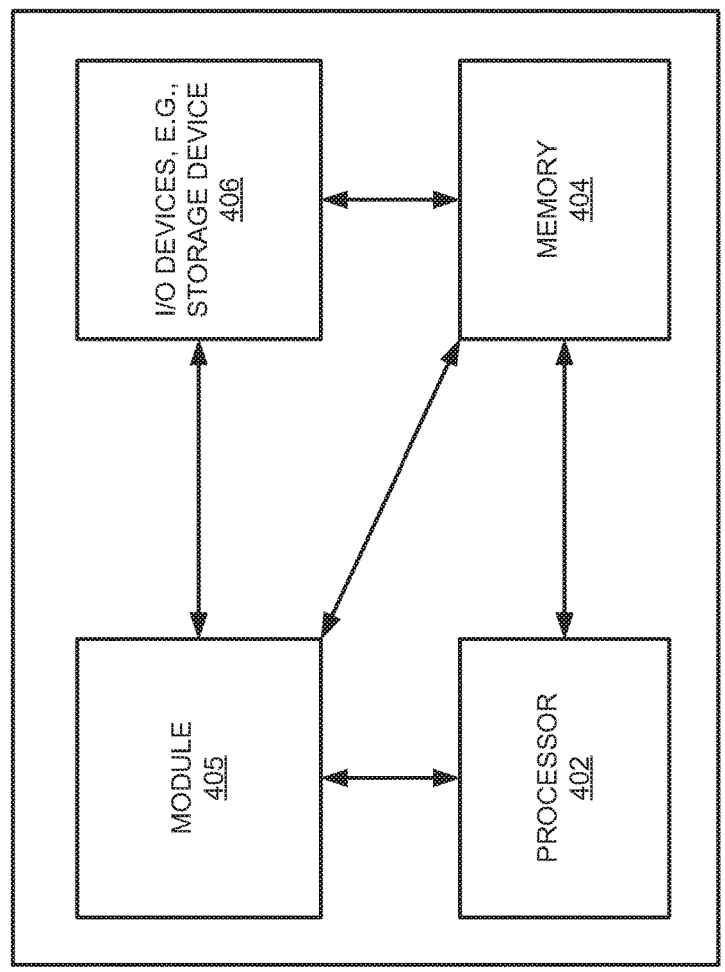
FIG. 4 depicts a high-level block diagram of a computing device specifically programmed to perform the functions described herein.

In one example, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In one example, at least some of the UEs 108, 110, 112, and 114 are smart mobility assistance devices that are attached either to conventional mobility assistance devices (e.g., a wheelchair or a walker) or to wearable items (e.g., a hip pack). In one example, any one or more of the user endpoint devices 108, 110, 112, and 114 may have both cellular and non-cellular access capabilities and may further have wired communication and networking capabilities (e.g., such as a desktop computer). It should be noted that although only four user endpoint devices are illustrated in FIG. 1, any number of user endpoint devices may be deployed. Any of the UEs 108, 110, 112, or 114 may comprise a general purpose computer that is configured to operate as a special purpose computer, as illustrated in FIG. 4 and discussed below. In one example, any of the UEs 108, 110, 112, or 114 may perform the methods discussed below related to providing mobility assistance.

In one example, the sensors 116 and 118 may include any type of sensor that is capable of wireless and/or wired communication via the Internet or core network 102. For instance, the sensors 116 and 118 may include sensors that monitor weather conditions in a given location (e.g., thermometers, barometers, humidity sensors, wind sensors, or the like), sensors that provide images of a given location (e.g., still and/or video cameras used for surveillance), or other types of sensors. Although only two sensors 116 and 188 are illustrated, the network 100 may include any number of such sensors.

In one example, the sensors 128 and 130 may include any type of sensor that is capable of wireless and/or wired communication via a personal area network (PAN), such as PAN 124 or PAN 126. For instance, the sensors 128 and 130 may communicate using the Bluetooth® wireless communication protocol or a similar protocol. As such, the sensors 128 and 130 may include sensors that monitor biometric data and/or health-related metrics, such as heart rate, sleep patterns, blood sugar, blood alcohol content, or the like.

In one example, the AS 104 may also or alternatively perform the methods discussed below related to providing mobility assistance. For instance, in one example, the AS 104 hosts an application that communicates with one or more of the UEs 108, 110, 112, and 114. As an example, the application may be a tracking application that subscribes to the output of one or more sensors of the UEs 108, 110, 112, and 114 and/or one or more of the remote sensors 116, 118, 128, or 130. In particular, the AS 104 may receive data recorded by the sensors of a smart mobility assistance device (e.g., one of the UEs 108, 110, 112, and 114) and/or one or more of the remote sensors 116, 118, 128, or 130, and may analyze the data to detect when a user of the smart mobility assistance device requires medical assistance. Alternatively, the AS 104 may receive signals from the smart mobility assistance device explicitly requesting medical assistance for the user. The AS 104 may further send signals to one or more of the UEs 108, 110, 112, and 114 operated by caregivers, emergency responders, medical personnel, or the like. The signal sent by the AS 104 may alert the recipient(s) to the fact that a user of the smart mobility assistance device requires medical assistance. The AS 104 may comprise a general purpose computer as illustrated in FIG. 5 and discussed below.

In one example, the DB 106 may store profiles for individual users of smart mobility assistance devices. The profile for a user may store data provided by a smart mobility assistance device used by the user, e.g., by sensors of the smart mobility assistance device. This data may depict movement of the user within a threshold period of time (e.g., the last x minutes). This movement could be evaluated on its own or compared to historical patterns of movement for the user (which may also be stored in the user profile) in order to determine when the user is likely to require medical assistance. The user profile may also include contact information for one or more individuals (e.g., caregivers, first responders, medical personnel, etc.) who are to be alerted when the user is likely to require medical assistance. The user profile may also include unique identifying information for the user, such as biometric information (e.g., fingerprints, ocular features, etc.), and health history information (e.g., heart rate, blood sugar, allergies, medications, etc.).

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
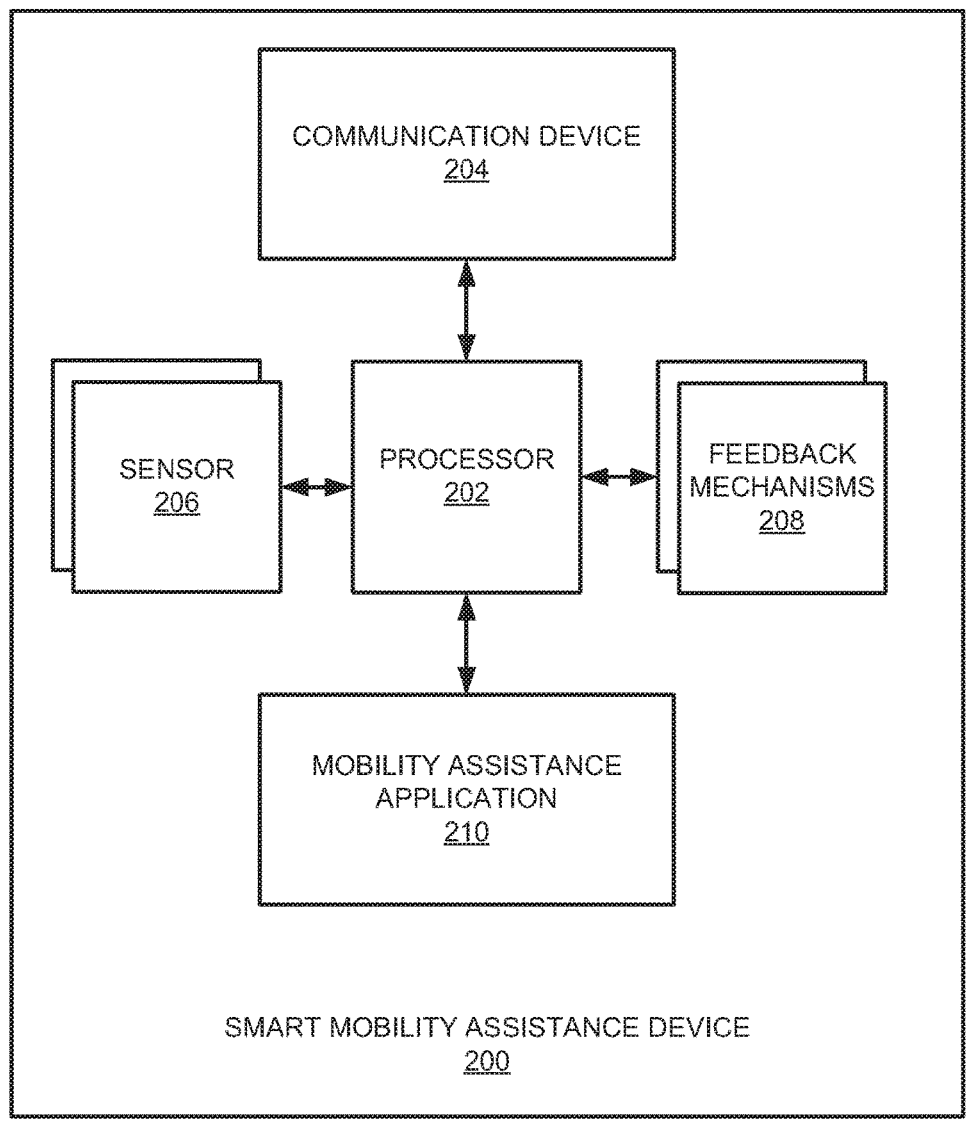
FIG. 2 illustrates a block diagram of components of a smart mobility assistance device of the present disclosure.

FIG. 2 illustrates a block diagram of components of a smart mobility assistance device 200 of the present disclosure. In one implementation, the smart mobility assistance device 200 may include a processor 202, a communication device 204, a set of sensors 206, a set of feedback mechanisms 208, and a mobility assistance application 210. The processor 202 may be in communication with the mobility assistance application 210, the communication device 204, the set of sensors 206, and the set of feedback mechanisms 208. The processor 202 may execute instructions associated with the mobility assistance application 210 to perform the functions described herein.

In one example, the communication device 204 may be a component to establish a connection to one of the access networks 120 or 122 of FIG. 1. For instance, the communication device 204 may be a network adapter. The network adapter may be a wireless network adapter that uses a Wi-Fi connection. The communication device 204 may further include a component to establish a local connection to one of the personal area networks 124 or 126 of FIG. 1. For example, the communication device 204 may further include a Bluetooth® radio. In a further example, the communication device may include only a component that can establish a local connection to a personal area network. In this case, the smart mobility assistance device 200 may use the communication device 204 to establish a local connection to a mobile phone or other device, which the smart mobility assistance device 200 can in turn use as a hot spot for connecting to one of the access networks 120 or 122.

In one implementation, the processor 202 may receive data from the set of sensors 206. The set of sensors 206 may comprise one or more different types of sensors that monitor a surrounding area for hazards that might impair a user's safe mobility. For instance, the set of sensors 206 might include a sensor for detecting pulses (e.g., radio or microwave pulses) that reflect off of objects in the surrounding area and return to the smart mobility assistance device, a sensor that captures images (e.g., still or video) of the surrounding area, a sensor that detects and measures movement or changes in orientation (e.g., an accelerometer), a sensor that tracks location (e.g., geographic coordinates), a biometric sensor (e.g., one that collects finger prints, ocular characteristics, or other biometrics), a health sensor (e.g., one that monitors heart rate, blood sugar, blood alcohol content, sleep patterns, or other health-related metrics) or another type of sensor.

The processor 202 may also receive data from one or more remote sensors, such as the remote sensors 116, 118, 128, or 130 of FIG. 1. As discussed above, these sensors may include weather sensors, still and/or video cameras, and sensors that monitor biometric data and health-related metrics.

Data collected by the set of sensors 206 (and/or one or more of the remote sensors 116, 118, 128, or 130) may be used by the mobility assistance application 210 to detect a hazard in the surrounding area (e.g., an object or condition that may impair the user's safe mobility). Depending on the type of data collected, the mobility assistance application 210 may be able to detect the type of hazard (e.g., object, weather conditions, uneven terrain, etc.), as well as the hazard's location and/or distance from the user. The data collected by the sensors can also be used to determine the user's identity and/or current location (e.g., geographic coordinates). The mobility assistance application 210 may further determine when and how to notify the user of any detected hazard, and may transmit a signal to the processor 202 when it determines that the user (or a third party) should be notified of a hazard.

In one example, the mobility assistance application 210 may communicate (e.g., via the communication device 204) with one or more remote processors, such as the application server 104 or a processor of one of the UEs 110 or 112 of FIG. 1 or another processor. Thus, processor intensive operations (such as identifying a hazard within a series of video images) could be performed in a remote or distributed manner in order to conserve resources locally on the smart mobility assistance device 200.

The processor 202 is further connected to the set of feedback mechanisms 208. When the mobility assistance application 210 detects a hazard in the surrounding area, the processor 202 may send an instruction to one or more feedback mechanisms 208 to generate an alert that notifies the user of the hazard. A first subset of the feedback mechanisms 208 may comprise one or more different types of mechanisms designed to provide feedback to the user, including mechanisms that provide audible feedback (e.g., a tone, a beep, or a recorded message), mechanisms that provide visual feedback (e.g., a light emitting diode (LED) indicator or a text message scrolling across a display), mechanisms that haptic feedback (e.g., a vibration or a rumble), or other types of mechanisms. A second subset of the feedback mechanisms 208 may comprise one or more different types of mechanisms designed to provide feedback to the conventional mobility assistance device, including mechanisms that communicate with electrical control systems (e.g., to apply a brake, reduce speed, or the like). A third subset of the feedback mechanisms may comprise one or more different types of mechanisms designed to provide feedback to systems external to the conventional mobility assistance device, including mechanisms that communicate with the external systems (e.g., to activate a door lock or other security feature in a memory care unit of a hospital or assisted living facility).

In one implementation, the processor 202 may share information relating to the user's identity, location, detected hazards, and the like with a third party, e.g., via the communication network 100 of FIG. 1. In this case, the processor 202 may instruct the communication device 204 to transmit the information to the network, where it can be accessed by the third party (e.g., a caregiver, a relative, a doctor, a first responder, or the like). In some cases, the processor 202 may also receive data from the network via the communication device 204.

Figure 3:
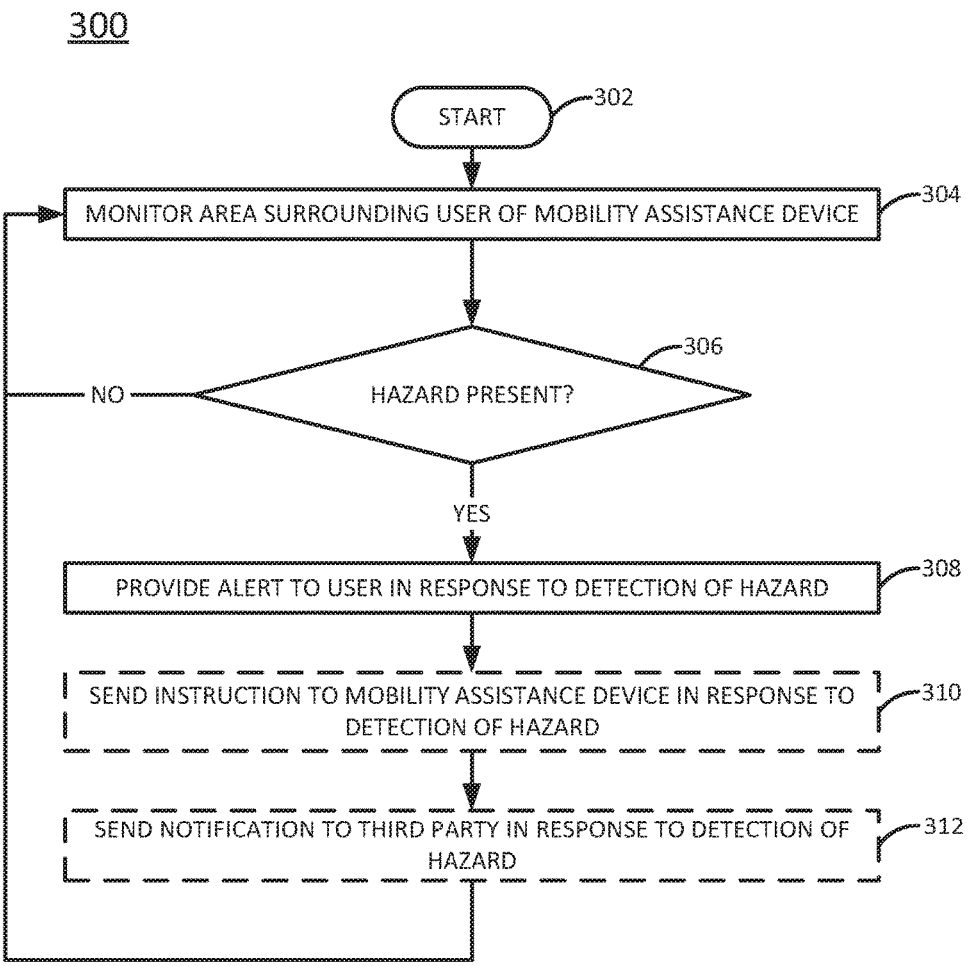
FIG. 3 illustrates a flowchart of an example method for providing mobility assistance.

To further aid in understanding the present disclosure, FIG. 3 illustrates a flowchart of an example method 300 for providing mobility assistance. In one example, the method 300 may be performed locally by a smart mobility assistance device. For instance, a UE 108, 110, 112, or 114 that is configured as a smart mobility assistance device and attached to a conventional mobility assistance device or to a wearable item could perform all or some steps of the method 300. In another example, the method 300 could be performed by an application server that subscribes to the output of one or more smart mobility assistance devices, e.g., AS 104 illustrated in FIG. 1. As such, any references in the discussion of the method 300 to the UEs 108, 110, 112, or 114 or to the AS 104 of FIG. 1 are not intended to limit the means by which the method 300 may be performed.

The method 300 begins in step 302. In step 304, the area surrounding the user is monitored. In one example, monitoring the surrounding area involves emitting a plurality of pulses (e.g., radio or microwave pulses) that reflect off of objects in the surrounding area and return to the smart mobility assistance device. From this information, the smart mobility assistance device may be able to determine the location of and distance to the objects. In another example, monitoring the surrounding area involves capturing images (e.g., still or video) of the surrounding area, from which the location of and distance to objects may also be determined. Image data has the additional advantage of being able to convey information about weather conditions (e.g., wet or icy surfaces) and/or uneven terrain in the surrounding area. In another example, monitoring the surrounding area may involve measuring movement via an accelerometer. From this information, the smart mobility assistance device may be able to determine whether the user is upright, has fallen down, is stationary, is moving, or is standing on an unstable surface. In another example, monitoring the surrounding area may involve tracking the user's location (e.g., geographic coordinates), e.g., via a global positioning system (GPS) or similar device. In one example, the geographic radius of the monitoring is increased when the user is stationary in order to protect against falls.

In step 306, it is determined whether a hazard is present in the surrounding area, based on the monitoring performed in step 304. For instance, the hazard might comprise an obstacle, a bit of uneven terrain, an incline or decline in the terrain, an unstable surface, an environmental condition (e.g., rain, ice, etc.), a health condition (e.g., heart rate, blood sugar, blood alcohol content, sleep patterns, etc.), or other object or condition that could impair the user's mobility or safety.

If the smart mobility assistance device concludes in step 306 that a hazard is not present, then the method 300 returns to step 304 and continues to monitor the surrounding area. If, however, the smart mobility assistance device concludes in step 306 that a hazard is present, then the method 300 continues to step 308.

In step 308, an alert is provided in response to the detection of the hazard. The alert warns the user to the presence of the hazard, so that he may proceed with increased caution and/or seek additional assistance, if necessary. In one example, the alert is an audible alert, such as a tone, a beep, or even a recorded message (e.g., "stop," "turn right," or "hazard ahead"). In one example, the volume of the alert may increase as the distance to the hazard decreases. In another example, the alert is a visual alert, such as a light emitting diode (LED) indicator lighting or a text message scrolling across a display. In another example, the alert is a haptic alert, such as a vibration or a rumble.

In optional step 310 (illustrated in phantom), an instruction may be sent to the conventional mobility assistance device, in response to the detection of the hazard (e.g., to aid the user in avoiding the hazard). For instance, if the conventional mobility device is an electric wheelchair or scooter, the smart mobility assistance device may send an instruction to the electric wheelchair or scooter that causes it to apply a brake (e.g., to stop or to slow down).

In optional step 312 (illustrated in phantom), a notification may be sent to a third party, such as a caregiver, a first responder, a relative, or medical professional, in response to the detection of the hazard. For instance, if the smart mobility assistance device determines that the user has fallen down, the notification may be sent to an ambulance or a doctor. Alternatively, if the smart mobility assistance device determines that the user is lost, the notification may request that the authorities issue a silver alert.

The method 300 then returns to step 304 and continues to monitor the surrounding area.

Although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 300 may be implemented as the system 400. For instance, a mobile device or an application server could be implemented as illustrated in FIG. 4.

As depicted in FIG. 4, the system 400 comprises a hardware processor element 402, a memory 404, a module 405 for providing mobility assistance, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for providing mobility assistance may include circuitry and/or logic for performing special purpose functions relating to monitoring, analyzing, and providing feedback relating to hazards (i.e., impediments to safe mobility) present in a user's surrounding area. The input/output devices 406 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a biometric sensor, a microwave or radio wave emitter/detector, an output port, an LED, a network adapter, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing mobility assistance (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing mobility assistance (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A device comprising:
a set of sensors to monitor a surrounding area of a user of a mobility assistance device, wherein the mobility assistance device comprises a wheelchair, a walker, a cane, a crutch, or a prosthetic;
a processor to detect a hazard in the surrounding area, based on data from the set of sensors;
a first set of feedback mechanisms to provide the user with an alert that notifies the user of the hazard; and
a communication device to send a notification to a third party informing the third party of the hazard.

2. The device of claim 1, wherein the device is configured to be attached to the mobility assistance device in a non-permanent manner.

3. The device of claim 1, wherein the set of sensors includes a sensor that detects a radio pulse reflected by an object in the surrounding area.

4. The device of claim 1, wherein the set of sensors includes a sensor that captures an image of the surrounding area.

5. The device of claim 1, wherein the set of sensors includes a sensor that detects a change in an orientation of the device.

6. The device of claim 1, wherein the set of sensors includes a sensor that detects a location of the user.

7. The device of claim 1, wherein the set of sensors includes a sensor that captures a biometric feature of the user.

8. The device of claim 1, wherein the set of sensors includes a sensor that captures a health-related metric of the user.

9. The device of claim 1, wherein the first set of feedback mechanisms includes a mechanism that provides an audible feedback.

10. The device of claim 1, wherein the first set of feedback mechanisms includes a mechanism that provides a visual feedback.

11. The device of claim 1, wherein the first set of feedback mechanisms includes a mechanism that provides a haptic feedback.

12. A method comprising:
monitoring a surrounding area of a user of a mobility assistance device, wherein the mobility assistance device comprises a wheelchair, a walker, a cane, a crutch, or a prosthetic;
detecting a hazard in the surrounding area, based on the monitoring;
providing the user with an alert that notifies the user of the hazard, in response to the detecting; and
sending a notification to a third party informing the third party of the hazard, in response to the detecting.

13. The method of claim 12, wherein the hazard comprises an obstacle.

14. The method of claim 12, wherein the hazard comprises a weather condition.

15. The method of claim 12, wherein the hazard comprises an uneven terrain.

16. The method of claim 12, wherein the hazard comprises a health condition of the user.

17. The method of claim 12, wherein the hazard comprises an injury to the user.

18. The method of claim 12, wherein the method is performed by a device that is attached to the mobility assistance device in a non-permanent manner.

19. A non-transitory computer-readable storage medium storing instructions which, when executed by a processor, cause the processor to perform operations, the operations comprising:
    monitoring a surrounding area of a user of a mobility assistance device, wherein the mobility assistance device comprises a wheelchair, a walker, a cane, a crutch, or a prosthetic;
    detecting a hazard in the surrounding area, based on the monitoring;
    providing the user with an alert that notifies the user of the hazard, in response to the detecting; and
    sending a notification to a third party informing the third party of the hazard, in response to the detecting.

20. The non-transitory computer-readable storage medium of claim 19, wherein the operations are performed by a device that is attached to the mobility assistance device in a non-permanent manner.

\* \* \* \* \*